United States Patent [19]

Miyagi et al.

[11] Patent Number: 5,703,864
[45] Date of Patent: Dec. 30, 1997

[54] PICKUP DEVICE FOR OTPICAL DISK

[75] Inventors: Takahiro Miyagi; Shigeru Takaya; Yoshifumi Masunaga, all of Tokorozawa, Japan

[73] Assignee: Pioneer Electronic Corporation, Tokyo-to, Japan

[21] Appl. No.: 623,821

[22] Filed: Mar. 29, 1996

[30] Foreign Application Priority Data

Mar. 30, 1995 [JP] Japan ................... 7-097941

[51] Int. Cl.$^6$ ................................................ G11B 7/12
[52] U.S. Cl. ................................ 369/112; 369/44.14
[58] Field of Search ........................... 369/112, 44.11, 369/44.12, 44.14, 44.15

[56] References Cited

U.S. PATENT DOCUMENTS 5,410,532   4/1995   Ohno et al. ...................... 369/112

Primary Examiner—Muhammad N. Edun
Attorney, Agent, or Firm—Morgan, Lewis & Bockius LLP

[57] ABSTRACT

An optical pickup device includes an objective lens assembly including an objective lens facing a surface of an optical disk, an actuator base supporting the objective lens to be movable, and a body in which an optical element is accommodated, the actuator base being supported by the body to be slidable. The actuator base is provided with a first flat portion positioned in a vicinity of the optical disk surface and a second flat portion apart from the optical disk surface, the first and second flat portions being formed with first and second protruded pieces having spherical end surfaces, and the body is formed with first and second receiving portions against which the first and second protruded pieces abut, respectively. The optical body is composed of a first supporting portion for supporting the first flat portion, a second supporting portion for supporting the second flat portion and an intermediate portion disposed below the first flat portion.

20 Claims, 4 Drawing Sheets

PICKUP DEVICE FOR OTPICAL DISK

BACKGROUND OF THE INVENTION

The present invention relates to a pickup device for an optical disk adapted to record information on an optical disk or reproduce the information recorded thereon.

An optical pickup device for recording and reproducing information by irradiating a light beam to an optical disk is well known in the conventional art. Such an optical pickup device is composed of a body, to which an optical system including a light source, a beam splitter and a light detector is mounted, and an objective lens driving unit including an objective lens and a driving means for driving the objective lens. In such an optical pickup device, the light is irradiated from the light source to an optical disk through the objective lens and a light reflected from the optical disk is received by the light detector through the objective lens to thereby record or reproduce the information. Further, the optical pickup device of this type is also provided with a mechanism for freely adjusting an inclination of the objective lens with respect to a disk surface for correctly performing the recording and reproducing of the information.

FIG. 7 shows an example of an optical pickup device having a conventional structure mentioned above. With reference to FIG. 7, a drive coil 3 comprising a focus coil 2 and a tracking coil is mounted to a lens holder 4, which is supported in a cantilevered manner to a suspension support member 6 secured to a yoke base 7 through a suspension member 5 consisting of four fine metal wires, and according to this arrangement, the lens holder 4 is supported in a floating manner as shown in FIG. 7. The yoke base 7 has an upper, as viewed, surface to which is secured a yoke 9 having a pair of rising pieces, to one of which a magnet 8 is mounted. Accordingly, the magnet 8 and yoke 9 constitute a magnetic circuit adapted to apply a magnetic flux to the drive coil mentioned above. The yoke base 7 is formed with a circular hole through which the light beam from a body 10 passes, and a plurality of protruded pieces 7x, each having a spherical surface, are formed around the circular hole. As described above, an objective lens drive unit 30 is constituted by the lens holder 4, the suspension member 5, the suspension support member 6, the yoke base 7, etc.

The body 10 has an inner hollow portion in which an optical unit 13, including a light source, a beam splitter and an optical detector, and a rise-up mirror 14 adapted to change the direction of and supply the light beam to the objective lens 2. A plurality of receiving portions 10x, against which the corresponding protruded pieces 7x abut, respectively, are formed to the peripheral portion of the rise-up mirror 14.

As shown in FIG. 7, the objective lens drive unit 30 is supported by the body 10 under the condition that the spherical protruded pieces 7x abut against the receiving portions 10x, respectively, and accordingly, the inclination of the objective lens 2 can be adjusted by relatively sliding these spherical protruded portions 7x and receiving portions 10x.

In the arrangement of the conventional optical pickup device shown in FIG. 7, since the center of the radius of each of the spherical protruded portions 7x is set so that it accords with an optical principal point of the objective lens 2, the distance between the surface of the disk 1 and the objective lens 2 is maintained constant even if the protruded pieces 7x and the receiving portions 10x are relatively slid for adjusting the inclination of the objective lens 2.

As can be seen from FIG. 7, in the conventional optical pickup device, the thickness of the device in the optical axis direction (direction perpendicular to the disk surface) is larger than the sum of the thicknesses of the lens holder 4, the yoke base 7 and the rise-up mirror 14. In such arrangement of the conventional structure, a relatively large thickness is required for the lens holder 4 because the drive coil 3 is secured to the lens holder 4, and a relatively large mass is also required for the rise-up mirror 14 in order to surely guide the beam to the objective lens. According to such requirements, it is difficult for the conventional structure to make thin the optical pickup device.

Another optical pickup device of conventional structure for solving the above problem is shown in FIG. 8, in which like reference numerals are added to elements corresponding to those shown in FIG. 7.

Referring to FIG. 8, the lens holder 4 has a portion to which the objective lens 2 is secured, and the portion has a thickness thinner than that of a portion to which the drive coil 3 is secured. According to this structure, since the rise-up mirror 14 is arranged near the objective lens 2, thus reducing the thickness of the pickup device, in comparison with the structure of FIG. 7.

However, in the structure of FIG. 8, since the end portion 7a of the yoke base 7 is positioned near a portion between the rise-up mirror 14 and the optical unit 13, it is required that the optical unit 13 is set so that the light passage of the light beam from the optical unit 13 is formed without being interfered with the end portion 7a of the yoke base 7, resulting in restriction of the arrangement of the optical unit 13.

SUMMARY OF THE INVENTION

A primary object of the present invention is to substantially eliminate defects or drawbacks encountered in the prior art described above and to provide an optical pickup device having a thin structure particularly provided with an adjusting mechanism capable of effectively adjusting an inclination of an optical axis.

This and other objects can be achieved according to the present invention by providing, in one aspect, an optical pickup device comprising: an objective lens assembly including an objective lens facing a surface of an optical disk; an actuator base supporting the objective lens to be movable; and a body in which an optical element is accommodated and from which light beam is projected towards the objective lens, the actuator base being supported by the body to be slidable, wherein the actuator base is provided with a first flat portion positioned in a vicinity of the optical disk surface and a second flat portion apart from the optical disk surface, the first and second flat portions being formed with first and second protruded pieces having spherical distal end surfaces, respectively, and the body is formed with first and second receiving portions against which the first and second protruded pieces abut, respectively, the first spherical distal end surface having a curvature different from that of the second spherical distal end surface; and a mechanism for adjusting an inclination of the objective lens by relatively sliding the first and second protruded portions with respect to the first and second receiving portions in abutting manner.

In preferred embodiment, the actuator base is further provided with a connecting portion connecting the first and second flat portions.

The central portions of the spherical end surfaces of the first and second protruded pieces accord with an optical principal point of the objective lens.

The adjusting mechanism comprises screws engaging the actuator base and the body.

The first and second receiving portions to provide flat receiving surfaces against which the spherical end surfaces of the first and second protruded pieces abut. The first and second receiving portions are formed as recessed portions having recessed spherical surfaces against which the spherical end surfaces of the first and second protruded pieces abut. The spherical end surface of the first protruded piece has a curvature smaller or than that of the first receiving portion.

In another aspect of the present invention, there is provided an optical pickup device comprising: an objective lens driving means supporting an objective lens in a floating manner so that the objective lens faces a surface of an optical disk; and a body from which a light beam is projected towards the objective lens, wherein the objective lens driving means comprises an actuator base and an objective lens holder supported in a floating manner with respect to the actuator base, the actuator base being provided with a first flat portion positioned in a vicinity of the optical disk surface, a second flat portion apart from the optical disk surface, and an oblique connecting portion connecting the first and second flat portions, said first flat portion being formed with a through hole through which the light beam passes and the second flat portion being formed with a magnetic circuit, and said objective lens holder is composed of a thin thickness portion holding the objective lens and a portion, thicker than the thin portion, holding a drive coil applied with magnetic flux by the magnetic coil in which the objective lens holder is supported in a floating manner so that thin portion faces the first flat portion and the thicker portion faces the second flat portion, and wherein the body is composed of a first supporting portion for supporting the first flat portion, a second supporting portion for supporting the second flat portion and an intermediate portion disposed below the through hole formed to the first flat portion, and a member disposed to the intermediate portion of the body for reflecting the light beam from a light beam source towards the optical disk surface through the through hole and the objective lens.

In preferred embodiment, the first and second flat portions are formed with first and second protruded pieces having spherical distal end surfaces, respectively, the first and second supporting portions being formed with first and second receiving portions against which the first and second protruded pieces abut, respectively, the first spherical distal end surface having a curvature different from that of the second spherical distal end surface and wherein an inclination of the objective lens by relatively sliding the first and second protruded portions with respect to the first and second receiving portions in abutting manner. The first and second receiving portions to provide flat receiving surfaces against which the spherical end surfaces of the first and second protruded pieces abut.

The first and second receiving portions are formed as recessed portions having recessed spherical surfaces against which the spherical end surfaces of the first and second protruded pieces abut. The spherical end surface of said first protruded piece has a curvature smaller or larger than that of said first receiving portion.

The inclination of the objective lens is adjusted by means of screws engaging said actuator base and said body.

The member for reflecting the light beam is a rise-up mirror reflecting the light beam parallel to the disk surface to the light beam vertical thereto.

According to the structures and characters of the present invention described above, the respective protruded pieces having the spherical end surfaces are disposed so that the central portion of the spherical surfaces are near the objective lens, and accordingly, the inclination of the optical axis of the objective lens can be adjusted without changing the distance between the objective lens and the disk surface even in a case where the distances between the objective lens and the respective protruded pieces are different.

Since the portion of the lens holder at which the objective lens is supported is made thin in thickness and the reflecting member is disposed directly below the thin portion, the entire structure of the optical pickup device can be made compact without obstructing the light beam path by the actuator base.

The nature and further features of the optical pickup device of the present invention will be made more clear from the following descriptions made with reference to the accompanying drawings.

DESCRIPTION OF THE PREFERRED EMBODIMENTS

Figure 7:
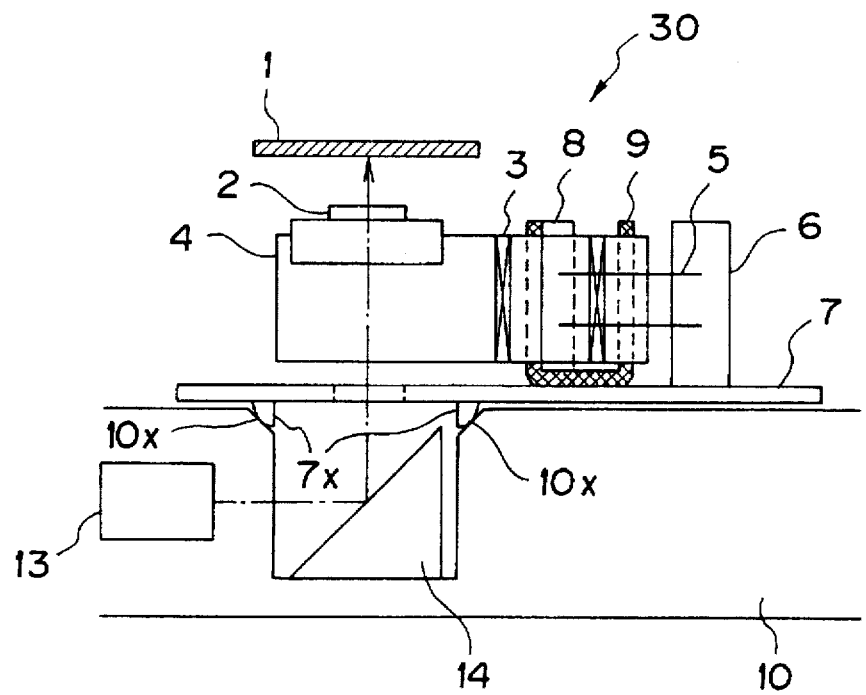
FIG. 7 is a schematic side view of one example of an optical pickup device of a conventional structure.
Figure 8:
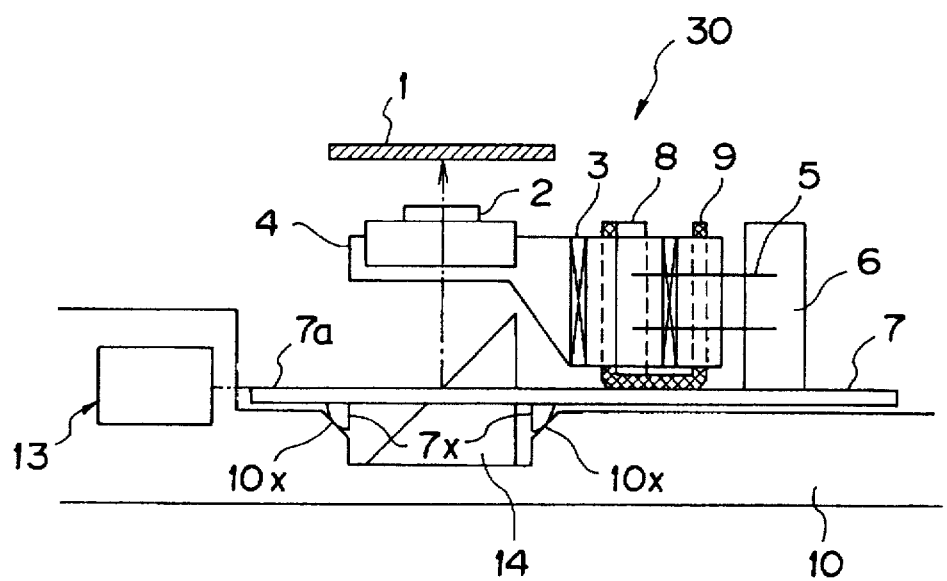
FIG. 8 is a schematic side view of another example of an optical pickup device of a conventional structure.

In the followings, it is first to be noted that like reference numerals are added to elements or members of embodiments of the present invention corresponding to those of the conventional structures shown in FIGS. 7 and 8.

Figure 1:
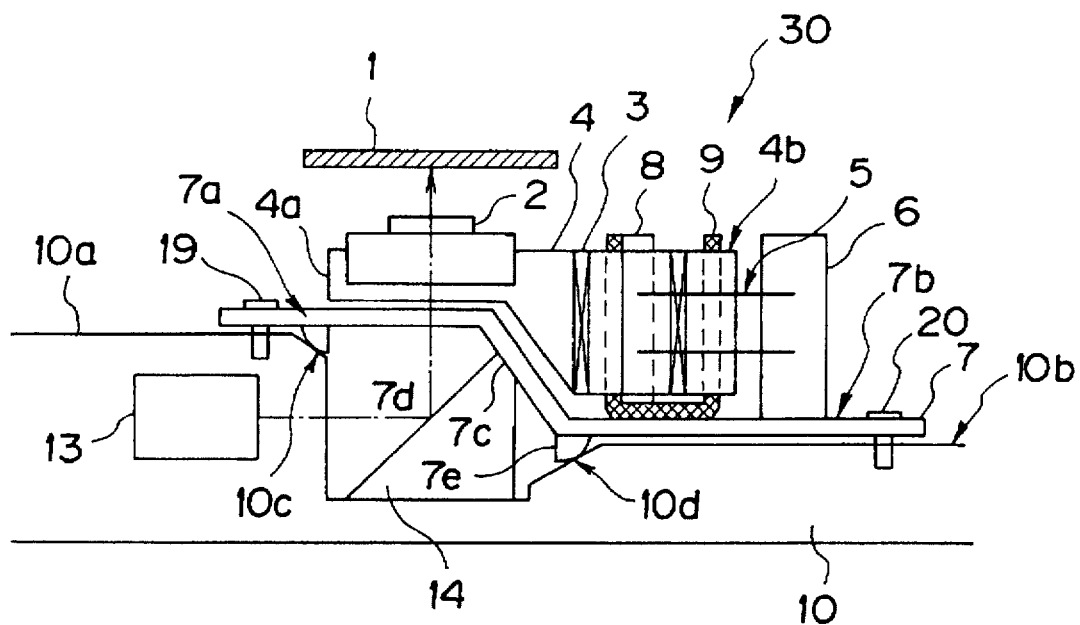
FIG. 1 is a schematic side view of a first embodiment of an optical pickup device according to the present invention.

FIG. 1 shows a whole structure of an optical pickup device for recording or reproducing information on or from an optical disk 1, which basically comprises elements or members similar to those of the device shown in FIG. 7 or 8.

According to the structure of FIG. 1, the lens holder 4 has a portion 4a having a thin thickness in a direction perpendicular to the surface of the disk 1 and a portion 4b having a thickness larger than that of the portion 4a. The objective lens 2 is mounted to the thin thickness portion 4a and the drive coil 3 is mounted to the thicker portion 4b. The lens holder 4 is connected to the suspension support member 6 secured to the yoke base 7 through the suspension member 5 composed of four fine metal wires to thereby support the lens holder 4 to be movable in a floating manner.

The yoke base 7 constituting an actuator base has a plate-like bent structure having a first flat portion 7a located near the surface of the disk 1, a second flat portion 7b apart from the disk surface and an intermediate connection portion 7c connecting the first and second flat portions 7a and 7b so as to provide a stepped structure as shown in FIG. 1 as a side view. The first flat portion 7a is located to a portion facing the thin thickness portion 4a of the lens holder 4 and provided with a circular hole 7f through which a light beam from the body 10 passes. A first spherical protruded piece 7d is formed to the lower surface of the first flat portion 7a so as to extend downward. The second flat portion 7b is located to a portion facing the portion 4b of the lens holder 4. A magnetic circuit composed of the suspension member 6, the magnet 8 and the yoke 9 is mounted to the upper surface of the second flat portion 7b, and the magnetic circuit itself has a structure similar to the conventional structure. A second spherical protruded piece 7e is formed to the lower surface of the second flat portion 7a so as to extend downward.

Figure 3:
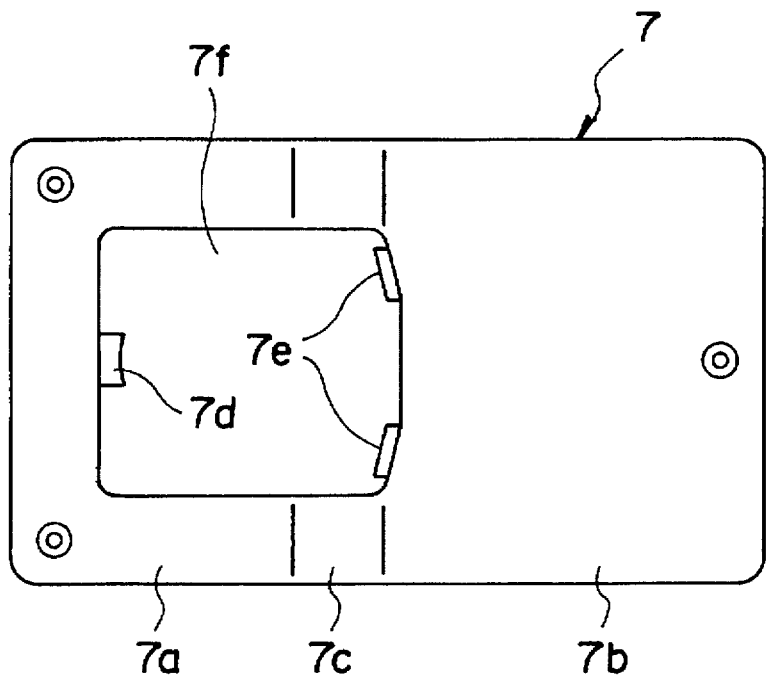
FIG. 3 is a plan view of a yoke base of the optical pickup device of the present invention.

With reference to FIG. 3 showing a plan view of the yoke base 7, two second spherical protruded pieces 7e are located at symmetric positions.

As mentioned with respect to the conventional structure of FIG. 7 or 8, the optical unit 13 comprises a light source, a beam splitter and an optical detector, and the rise-up mirror 14 for reflecting the light beam from the optical unit 13 and collecting it on the objective lens 2 are provided to the body 10. The rise-up mirror 14 is positioned directly below the first flat portion 7a of the yoke base 7.

The body 10 has a first support portion 10a supporting the first flat portion 7a of the yoke base 7 and a second support portion 10b supporting the second flat portion 7b, both portions 10a and 10b being disposed in the vicinity of the rise-up mirror 14, in which the first support portion 10a is positioned near the disk 1 in comparison with the second support portion 10b. The first support portion 10a is formed with a first receiving portion 10c against which the first spherical protruded piece 7d abuts, and the second support portion 10b is formed with a second receiving portion 10d against which the second spherical protruded pieces 7e abut. According to this structure, the first flat portion 7a of the yoke base 7 is supported by the first support portion 10a of the body 10 at a portion apart from the light beam path between the optical unit 13 and the rise-up mirror 14 so that the light beam path is not interfered with the yoke base 7.

Further with reference to FIG. 1, the objective lens drive unit 30 is supported by the body 10 in a manner such that the first spherical protruded piece 7d abuts against the first receiving portion 10c and the second spherical protruded pieces 7e abut against the second receiving portion 10d. According to such structure, when these abutting surfaces are relatively slid to each other, the inclination of the objective lens 2 can be adjusted. In FIG. 1, reference numerals 19 and 20 denote adjusting screws which engages the body 10 and the yoke base 7, and the respective spherical protruded pieces are slid through the adjustment of the screws 19 and 20, whereby the inclination of the objective lens 2 can be adjusted.

In this embodiment, the first and second protruded pieces 7d and 7e are designed so that the centers of the spherical surfaces thereof accord with the optical principal point of the objective lens 2 and that the curvatures of these spherical protruded pieces are different from each other. Accordingly, even if the inclination of the objective lens 2 is adjusted by relatively sliding the respective spherical protruded pieces and the corresponding receiving portions, the distance between the disk 1 and the objective lens 2 can be always maintained constant.

Figure 2:
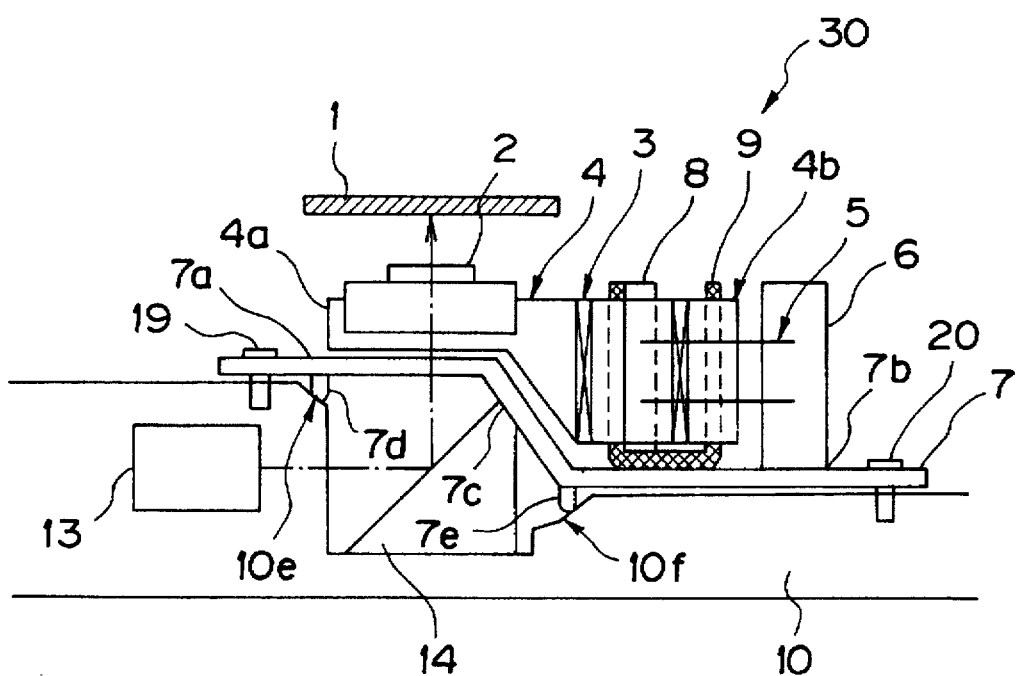
FIG. 2 is a schematic side view of a second embodiment of an optical pickup device according to the present invention.

FIG. 2 represents a second embodiment of the present invention, in which a first spherical recessed portion 10e, corresponding in its shape to the first spherical protruded piece 7d is formed to the first support portion 10a in place of the first receiving portion 10c in the first embodiment, and a second spherical recessed portion 10f, corresponding in its shape to the second spherical piece 7e is formed to the second support portion 10b in place of the second receiving portion 10d in the first embodiment. According to this second embodiment, the relative sliding motion between the spherical protruded pieces and the spherical recessed portions can be done with high performance.

The relative relationships in the surface shapes between the respective spherical protruded pieces and receiving portions will be described hereunder with reference to FIGS. 4 to 6.

Figure 4:
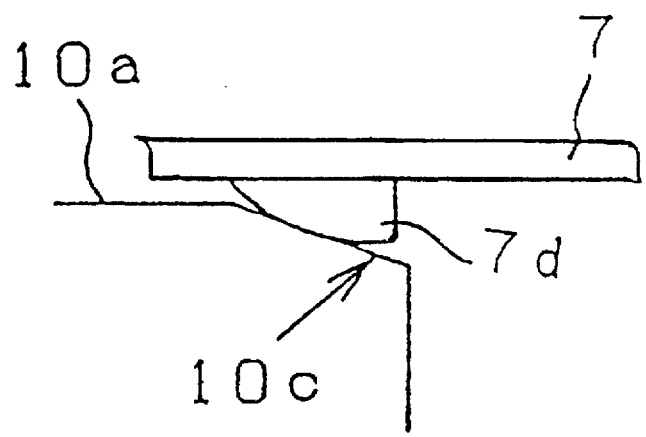
FIG. 4 is a view, in an enlarged scale, showing one example of a structural relationship between a yoke base and a body, in an abutting state, of the optical pickup device of the present invention.

FIG. 4 shows a state in which the first receiving portion 10c, against which the first spherical protruded piece 7d formed to the yoke base 7 abuts, is formed so as to provide a flat surface. According to this example, the surface working to the receiving portion can be easily done, thus being advantageous.

Figure 5:
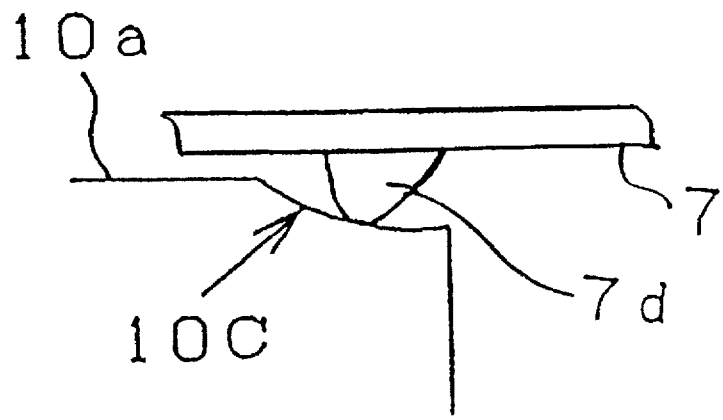
FIG. 5 is a view, in an enlarged scale, showing another example of a structural relationship between a yoke base and a body, in an abutting state, of the optical pickup device of the present invention.

FIG. 5 shows a state in which the curvature of the spherical end surface of the first spherical protruded piece 7d formed to the yoke base 7 is made smaller than the curvature of the spherical surface of the first receiving portion 10c against which the protruded piece 7d abuts. According to this example, a good sliding performance can be achieved even if a working error to the spherical protruded piece 7d exists, and a range for inclination allowance of the objective lens can be made wide.

Figure 6:
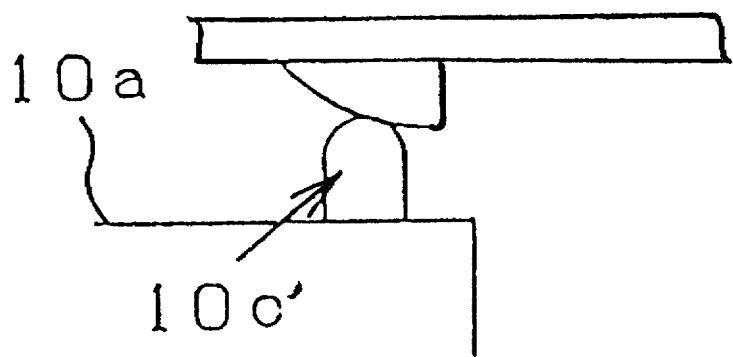
FIG. 6 is a view, in an enlarged scale, showing a further example of a structural relationship between a yoke base and a body, in an abutting state, of the optical pickup device of the present invention.

FIG. 6 shows a modification of the first receiving portion. As seen, the first receiving portion 10c is replaced with a protruding portion 10c' to abut against and support the first spherical protruded piece 7d. The curvature of the spherical front surface of the first spherical protruded piece 7d formed to the yoke base 7 is made larger than the curvature of the spherical surface of the protruding portion 10c' against which the protruded piece 7d abuts. According to this example, a range for inclination allowance of the objective lens can be made wide like the example of FIG. 5.

According to the optical pickup device of the present invention, the inclination of the optical axis of the objective lens can be adjusted without changing the distance between the objective lens and the disk surface even in a case where the distances between the objective lens and the respective spherical protruded pieces formed to the yoke base are different. Accordingly, even in a case where the yoke base has a bent structure, the inclination of the objective lens can be effectively adjusted, so that the freedom in design of the objective lens drive unit can be improved and the optical pickup device can be hence made compact and thin. In the preferred embodiment, there is provided a structure in which the light beam passage in the body cannot be prevented by the actuator base.

What is claimed is:

1. An optical pickup device comprising:
   an objective lens assembly including an objective lens facing a surface of an optical disk;
   an actuator base supporting the objective lens to be movable; and a body in which an optical element is accommodated and from which light beam is projected towards the objective lens, said actuator base being supported by said body to be slidable, wherein said actuator base has a plate-like bent structure with a first flat portion positioned in a vicinity of the optical disk surface and a second flat portion apart from the optical disk surface, said first and second flat portions being formed with first and second protruded pieces having spherical end surfaces, respectively, said body being formed with first and second receiving portions against which said first and second protruded pieces abut, respectively, and wherein an inclination of the objective lens is adjustable by relatively sliding said first and second protruded pieces with respect to said first and second receiving portions in abutting manner.

2. An optical pickup device according to claim 1, wherein said first spherical end surface has a curvature different from that of said second spherical end surface.

3. An optical pickup device according to claim 1, wherein said actuator base is further provided with a connecting portion connecting said first and second flat portions.

4. An optical pickup device according to claim 1, wherein central portions of the spherical end surfaces of said first and second protruded pieces accord with an optical principal point of the objective lens.

5. An optical pickup device according to claim 1, wherein said adjusting means comprises screws engaging said actuator base and said body.

6. An optical pickup device according to claim 1, wherein said first and second receiving portions provide flat receiving surfaces against which the spherical end surfaces of said first and second protruded pieces abut.

7. An optical pickup device according to claim 1, wherein said first and second receiving portions are formed as recessed portions having recessed spherical surfaces against which the spherical end surfaces of said first and second protruded pieces abut.

8. An optical pickup device according to claim 7, wherein the spherical end surface of said first protruded piece has a curvature smaller than that of said first receiving portion.

9. An optical pickup device according to claim 7, wherein the spherical end surface of said first protruded piece has a curvature larger than that of said first receiving portion.

10. An optical pickup device according to claim 1, wherein said body is composed of a first supporting portion for supporting said first flat portion, a second supporting portion for supporting said second flat portion and an intermediate portion disposed below the first flat portion and wherein means for reflecting the light beam from a light beam source towards the optical disk surface through the objective lens is disposed to the intermediate portion of said body.

11. An optical pickup device according to claim 10, wherein said means for reflecting the light beam is a rise-up mirror reflecting the light beam parallel to the disk surface to the light beam vertical thereto.

12. An optical pickup device according to claim 11, wherein said first and second flat portions are formed with first and second protruded pieces having spherical end surfaces, respectively, said first and second supporting portions being formed with first and second receiving portions against which said first and second protruded pieces abut, respectively, said first spherical end surface having a curvature different from that of said second spherical end surface and wherein an inclination of the objective lens is adjusted by relatively sliding said first and second protruded pieces with respect to said first and second receiving portions in abutting manner.

13. An optical pickup device according to claim 12, wherein said first and second receiving portions provide flat receiving surfaces against which the spherical end surfaces of said first and second protruded pieces abut.

14. An optical pickup device according to claim 12, wherein said first and second receiving portions are formed as recessed portions having recessed spherical surfaces against which the spherical end surfaces of said first and second protruded pieces abut.

15. An optical pickup device according to claim 14, wherein the spherical end surface of said first protruded piece has a curvature smaller than that of said first receiving portion.

16. An optical pickup device according to claim 14, wherein the spherical end surface of said first protruded piece has a curvature larger than that of said first receiving portion.

17. An optical pickup device according to claim 12, wherein the inclination of the objective lens is adjusted by means of screws engaging said actuator base and said body.

18. An optical pickup device according to claim 1, wherein the first and second flat portions are vertically displaced with respect to each other.

19. An optical pickup device comprising:

an objective lens driving means supporting an objective lens in a floating manner so that said objective lens faces a surface of an optical disk; and a body from which a light beam is projected towards the objective lens, said objective lens driving means comprising a actuator base and an objective lens holder supported in a floating manner with respect to said actuator base, said actuator base being provided with a first flat portion positioned in a vicinity of the optical disk surface, a second flat portion apart from the optical disk surface, and an oblique connecting portion connecting said first and second flat portions, said first flat portion is formed with a through hole through which the light beam passes and said second flat portion being formed with a magnetic circuit, said objective lens holder being composed of a thin thickness portion holding the objective lens and a portion, thicker than the thin portion, holding a drive coil applied with magnetic flux by the magnetic coil in which said objective lens holder is supported in a floating manner so that thin portion faces said first flat portion and said thicker portion faces said second flat portion, and said body being composed of a first supporting portion for supporting said first flat portion, a second supporting portion for supporting said second flat portion and an intermediate portion disposed below said through hole formed to the first flat portion, and means disposed to the intermediate portion of the body for reflecting the light beam from a light beam source towards the optical disk surface through the through hole and the objective lens.

20. An optical pickup device according to claim 19, wherein said means for reflecting the light beam is a rise-up mirror reflecting the light beam parallel to the disk surface to the light beam vertical thereto.

* * * * *